United States Patent [19]
Leva

[11] Patent Number: 5,200,119
[45] Date of Patent: Apr. 6, 1993

[54] TOWER PACKING ELEMENT

[76] Inventor: Max Leva, 1 Hodgson Ave., Pittsburgh, Pa. 15205

[21] Appl. No.: 697,806

[22] Filed: May 9, 1991

Related U.S. Application Data

[63] Continuation-in-part of Ser. No. 530,195, May 29, 1990, abandoned, which is a continuation-in-part of Ser. No. 395,196, Aug. 17, 1989, abandoned, which is a continuation of Ser. No. 722,841, Apr. 11, 1985, abandoned.

[51] Int. Cl.$^5$ .................................................. B01F 3/04
[52] U.S. Cl. ................................ 261/94; 261/DIG. 72
[58] Field of Search ...................................... 261/94–98, 261/112.0, 112.2, DIG. 72; 55/90, 233; 210/150; 202/158; 422/310, 311, 224; D23/3, 4, 200; 366/336–338

[56] References Cited

U.S. PATENT DOCUMENTS

| | | | |
|---|---|---|---|
| 2,602,651 | 7/1952 | Cannon | 261/DIG. 72 |
| 4,203,934 | 5/1980 | Leva | 261/98 |
| 4,303,599 | 12/1981 | Strigle, Jr. et al. | 261/98 |
| 4,316,863 | 2/1982 | Leva | 261/98 |
| 4,327,043 | 4/1982 | Leva | 261/94 |
| 4,333,892 | 6/1982 | Ellis et al. | 261/94 |
| 4,376,081 | 3/1983 | Leva | 261/94 |
| 4,496,498 | 1/1985 | Pluss | 261/95 |
| 4,557,876 | 12/1985 | Nutter | 261/94 |

FOREIGN PATENT DOCUMENTS

| | | |
|---|---|---|
| 2603124 | 8/1976 | Fed. Rep. of Germany ... 261/DIG. 72 |
| 2750814 | 6/1979 | Fed. Rep. of Germany ... 261/DIG. 72 |

OTHER PUBLICATIONS

Norton; "Metal Intalox Tower Packing"; Bulletin MI--80; copyright 1977; Norton Co.; Akron, Ohio.

*Primary Examiner*—Richard L. Chiesa
*Attorney, Agent, or Firm*—Carothers & Carothers

[57] ABSTRACT

A new tower packing element intended for randomly dumped packed beds. The new tower packing consists essentially of at least two substantially straight legs which are attached tangentially to the ends of an arcuately bent surface. The straight legs contain slots. Tongues either associated with the slots or independent of the slots point away from these substantially straight legs. The arcuately bent portion is free of slots and tongues.

34 Claims, 4 Drawing Sheets

# TOWER PACKING ELEMENT

This is a continuation-in-part of my application Ser. No. 07/530,195 filed May 29, 1990 now abandoned, which in turn is a continuation-in-part of my application Ser. No. 07/395,196 filed Aug. 17, 1989, now abandoned, which in turn is a continuation of my application Ser. No. 722,841 filed on Apr. 11, 1985, and now abandoned.

This invention relates to a tower packing element for use in random poured packed beds in towers and columns, to bring about mass and heat transfer in gas absorptions, distillations in chemical and physical operations.

BACKGROUND OF THE INVENTION

Virtually all of the presently available randomly dumped tower packings are afflicted with a number of deficiencies. Probably the most serious of these deficiencies is that when the packings are randomly dumped, large variations in bed characteristics will result. Generally speaking, these variations in bed characteristics are not only related to the way in which the bed was prepared, but also appear to be time-related. This is usually caused by settling of the tower packing elements in the tower, as well as subsequent internal shifting of the packing pieces in relation to each other. These normally uncontrollable happenings cause instabilities which affect gas and particularly liquid distributions inside of the packed bed adversely. Thus, the efficiency level and operational stability of the presently available packings when used in packed beds is very uncertain.

It has now been found completely unexpectedly and surprisingly that with packing elements that embody certain individual random construction features, the internal liquid distribution improves dramatically, with the result that the aforementioned uncertainties in efficiency and operational stability are largely overcome.

Having recognized this situation, the present new packing elements comprise, in their geometry, typical elements that enhance the state of randomness of the packed bed, and thereby achieve the result of minimizing the operational instabilities spoken of above.

SUMMARY OF THE INVENTION

Generally speaking, the new packing which is the subject of the invention comprises an arcuately bent strip, pointing with its convex side upwardly. Substantially straight legs are joined smoothly and tangentially to each of the two ends of the arcuately bent strip in a manner that the continuations of the straight legs upwardly of the convex side of the arcuate strip define a characteristic angle. That end of the straight leg which is not tangentially attached to the arcuate strip may either remain open ended or it may be joined smoothly and tangentially to a second arcuate strip, which displays a curvature that is opposite in direction to that of the first arcuate strip. At least one of the straight legs shall be provided with a slot and a tongue, which is displaced from the surface of the leg, and shall be contained within the space defined by the two straight legs.

Having thus generally described the new invention, specific features of the invention will now be presented in FIGS. 1 to 20.

DESCRIPTION OF THE PREFERRED EMBODIMENTS

Figure 1:
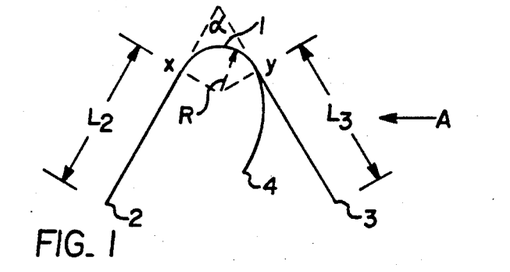
FIG. 1 is a frontal elevation of the new tower packing element which is basically in accordance with the general description of the invention.

Considering now FIG. 1 in detail, the arcuately bent strip is denoted by numeral 1. It is noted that it is a part of a circle, having a radius of curvature R. The extent through which the arc extends is indicated by the span x - - - y, and it is noted that the arc is substantial. At points x and y, denoting the ends of the arcuate bend, substantially straight legs (henceforth referred to merely as straight legs) 2 and 3 are tangentially attached to the arcuate bend. The lengths of straight legs 2 and 3 are denoted by $L_2$ and $L_3$, respectively. A single tongue denoted by numeral 4 depends from, and points away from straight leg 3. The tongue is curved and is dimensioned so as to extend into the space between straight legs 2 and 3.

When the straight legs 2 and 3 are projected upwardly beyond the ends x and y of the arcuate bend, they will define the characteristic angle $\alpha$. As will be pointed out later, much importance attaches to the numerical value of $\alpha$. In the case of FIG. 1, $\alpha = 60$ degrees. With a radius of curvature R equal to 10 millimeters, the arcuate bend is equal to 21 millimeters. Compared to lengths $L_2$ and $L_3$ of the straight legs 2 and 3, which in FIG. 1 are equal to 35 millimeters, the arcuate bend-straight leg ratio is equal to 0.60.

It will be noted that the arcuate bend x - - - y is smooth and without any slots and tongues, or other flow-interfering components. This is important, because as fluids (liquids and gases) enter the space between straight legs 2 and 3, as well as through slots that may be contained in the straight legs, the fluids will impinge on the smooth convex underside of the arcuate bend and are deflected around. This will result in generation of beneficial turbulence mixing of the fluids, which leads to improved liquid distribution in the packed bed. Thus improved mass transfer will occur without an undue expenditure of pressure drop, all on account of the effect of the smooth convex curvature of the arcuate bend.

It is therefore obvious that in order for these beneficial results to occur, the extent of the arcuate bend must be substantial. Therefore, in no event could a sharp V-type bend, as would be generated by a very small radius of curvature, be relied upon to produce the above-described desirable results. A sharp bend would, in fact, hinder the establishment of such a flow scheme by offering undue flow resistance without providing commensurate mass transfer. Additionally, sharp bends cause high liquid holdup which would encourage fouling and other difficulties.

It is, therefore, seen that the new packing elements, by embodying the diverse construction elements, as exemplified by combining alternatingly straight legs with arcuately bent surfaces, will lead to improved performance.

Figure 2:
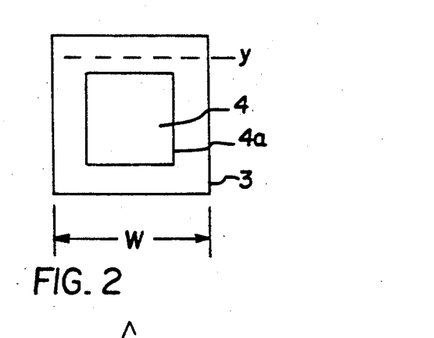
FIG. 2 is a side elevation of the tower packing element presented in FIG. 1, as seen in direction of arrow A.

FIG. 2 is a side elevation of the packing element shown in FIG. 1, as seen in the direction of arrow A. Straight leg 3 is noted to connect with end y of the arcuate bend. Straight leg 3 contains a slot which is identified by numeral 4a. Whereas, slot 4a is shown to be rectangular it, as well as any other slots, may be of trapezoidal, triangular, polygonal or of any other convenient shape without fundamentally influencing the intended functioning of the packing, which is to allow fluids to pass either way through the slots.

It will be noted that tongue 4 though curved is essentially of the same stretched out length as the length of slot 4a. Whereas this will usually result when the tongue is pressed out of the surface of the leg to form the slot, it is, as will be discussed later, entirely within the spirit of the invention to provide tongues that are shorter or longer than the slots with which they are associated, or the tongues may be of different shape than the slots.

The width of the packing element is denoted by W. This dimension of the element may vary between rather wide limits. However, when related to the lengths L of the straight legs, the variation of W takes on added significance. Thus, in the widest sense, it was found that $3W > L > W/6$. However more specifically as will be discussed later $2.5W > L > W/5$.

Figure 3:
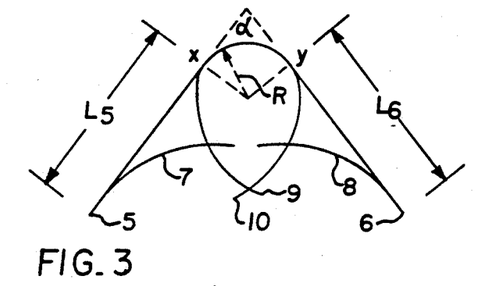
FIG. 3 is another frontal elevation of the invention presenting additional details.

FIG. 3 is another design of the new packing element. The arcuate bend with radius of curvature R is again defined by the span x - - - y, whereto straight legs 5 and 6 are tangentially attached. The straight legs are of equal lengths which are identified by $L_5$ and $L_6$. For the element shown in FIG. 3, the angle $\alpha$ is 75 degrees, generating a substantially wider spread between straight legs 5 and 6 than resulted in FIG. 1, where $\alpha$ was only 60 degrees. With this wider spread of straight legs of FIG. 3, more than a single tongue is required to fill the space between the straight legs effectively with contacting surface. With this objective in mind, a total of four curved tongues, denoted by numerals 7, 8, 9 and 10, are shown in FIG. 3. These four tongues normally call for four slots, which are, however, not indicated in FIG. 3. The arrangement of these four tongues may be in various ways, but preferably each straight leg would be equipped with two separate rows of slots.

The dimensioning of the packing element shown in FIG. 3 is typical. The straight legs are 42 millimeters long and the arcuate bend, having a radius of curvature of 12 millimeters, produces a span x - - - y of 22 millimeters, when stretched out. Thus for FIG. 3, the arcuate bend-straight leg ratio is equal to a substantial value of 0.52.

Figure 4:
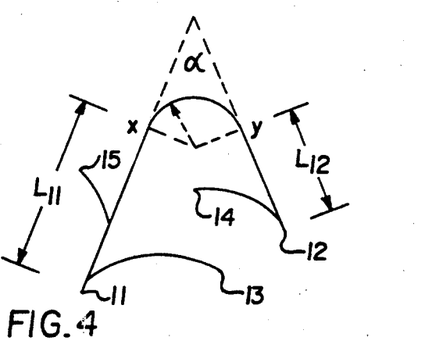
FIG. 4 is still another frontal elevation of the invention, presenting more details of construction.

Two additional new features are introduced by the new packing element shown in FIG. 4. The arcuate bend that results from a radius of curvature R of eleven millimeters and $\alpha$ equal to 45 degrees is equal to 26 millimeters, and is presented by span x - - - y. Tangentially joined to end x is straight leg 11, and joined tangentially to end y is straight leg 12. The novel feature is that the two straight legs 11 and 12 are of unequal lengths, as is indicated by $L_{11}$ and $L_{12}$ respectively. One of the benefits arising from using straight legs of unequal lengths is that through the additional randomness thus introduced into the packed bed, more fluid turbulence will result, leading to improved performance.

Straight legs 11 and 12 embody slots, which from the elevational sketch, FIG. 4 are, however, not apparent. Tongues 13, 14 and 15 depend from ends of these slots, and point away from the straight legs. Specifically, tongues 13 and 14 point inwardly into the packing element, whereas tongue 15 points outwardly and away from the packing. Provision of such tongues that point away from the packing and into the packed bed were found to be especially beneficial to (1) minimize undesirable in-line arrangement of the packing pieces and (2) to serve as additional contact points between packing elements that will enhance better internal liquid distribution in the packed bed. Thus, by providing the new packing elements with outwardly pointing tongues is a further means of achieving better performance.

In the typically dimensioned piece, as shown in FIG. 4, the stretched out length of the arcuate bend is equal to 26 millimeters. Thus referred to the long leg 11, of 39 millimeters length, the arcuate bend-straight leg ratio is equal to 0.67, whereas in regard to the shorter straight leg 12 of only 24 millimeters length, the arcuate bend-straight leg ratio is equal to 1.08.

As the angle $\alpha$ is decreased further, below 45 degrees, a variation in design of the new packing element must be introduced, to assure that the tongues remain accessible to the fluids, passing through the randomly packed bed.

Figure 5:
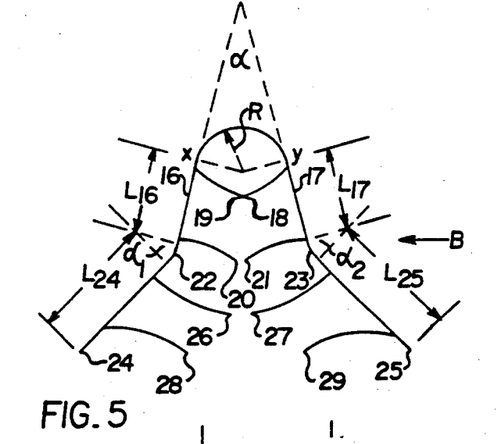
FIG. 5 is a frontal elevation of a form of the invention that presents still additional construction elements.

This is readily seen from FIG. 5, where a new packing element in accord with the invention is shown, for which the angle $\alpha$ has now been decreased to 30 degrees. It will be noted that the arcuate bend defined by span x - - - y is substantial. Joined tangentially to x and y are primary straight legs 16 and 17, being of lengths $L_{16}$ and $L_{17}$ respectively. Also shown are tongues 18, 19, 20 and 21 which have been struck out of straight legs 16 and 17, to form slots which are, however, not indicated in the front view elevational sketch, FIG. 5, describing this variation of the invention.

It is seen that with the decrease of angle $\alpha$, primary straight legs 16 and 17 are now coming so close together that the tongues 18, 19, 20 and 21, depending therefrom, become quite crowded into a relatively narrow space. This tends to decrease their effectiveness by discouraging the fluids to enter into the space between straight legs 16 and 17. Hence, the primary straight legs 16 and 17, instead of terminating openendedly, as do all of the other straight legs considered before, will, instead, connect tangentially to secondary arcuate bends 22 and 23. These secondary arcuate bends exhibit curvatures that are opposite to the curvature of the primary arcuate bend, defined by radius of curvature R, and extend through angles $\alpha_1$ and $\alpha_2$, which in the case of FIG. 5, have both been chosen to be 30 degrees, merely by way of example.

Finally, secondary straight legs 24 and 25 are tangentially attached to the lower ends of the secondary arcuate bens 22 and 23, and proceed along their lengths $L_{24}$ and $L_{25}$, to terminate openendedly. Thus by this expedient, tongues 26, 27, 28 and 29 are much more exposed to the moving fluids than are tongues 18, 19, 20 and 21, and a further improvement in performance is achieved with this arrangement.

Figure 6:
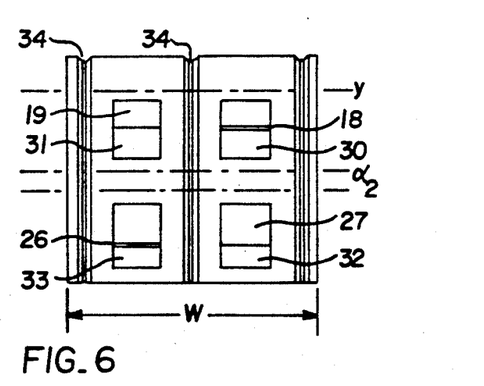
FIG. 6 is a side view of the new tower packing element shown in FIG. 5, as seen in direction of arrow B.

FIG. 6 is an elevational side view of the element of FIG. 5, as seen in direction of arrow B. FIG. 6 makes reference to some of the features already identified in FIG. 5. In addition, however, FIG. 6 shows slots 30, 31, 32 and 33, as well as stiffening grooves, denoted by numeral 34, provided in accordance with the usual practices, to mechanically strengthen the new packing element.

The width of the element is indicated by W, and is in relation to the lengths of the straight legs, all in accord with one of the earlier presented rules.

Figure 7:
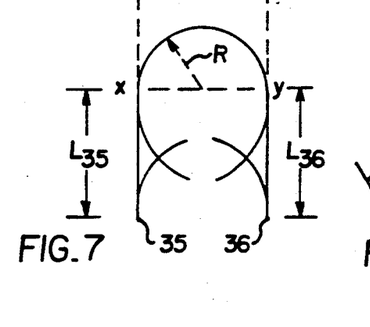
FIG. 7 is another frontal elevation of a further form of the invention.

From considerations of FIGS. 1, 3, 4 and 5, it has already been learned that the magnitude of angle $\alpha$ is important. Considering this further, another design of the invention is shown in FIG. 7, in which $\alpha$ has been reduced to zero degrees, which makes straight legs 35 and 36 of lengths $L_{35}$ and $L_{36}$ parallel to each other. With the radius of curvature R equal to 15 millimeters, the length of the arc x - - - y to which straight legs 35 and 36 are tangentially attached is 47 millimeters. With practical lengths $L_{35}$ and $L_{36}$ of 30 millimeters, the arc would now be appreciably longer than the lengths of the straight legs. Moreover, it is seen that the distance between the straight legs 35 and 36 is now as small as it can be, which would severly limit fluid entry into the interior of the packing, and would most certainly require to equip such an element, where $\alpha$ is equal to zero degrees, with secondary straight legs. It may, therefore, be concluded that an element of the design shown in FIG. 7 would have only limited use. Thus with metal as the material of construction, the angle $\alpha$ should not be smaller than 20 degrees.

Figure 8:
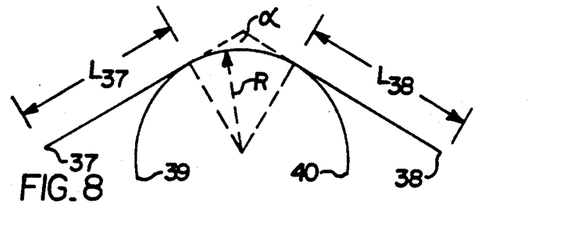
FIG. 8 is still another elevational presentation defining additional features of the invention.

Considering now the other extreme, FIG. 8 shows a form of the invention in which $\alpha=120$ degrees. With R=23 millimeters, the length of the arc between ends x and y will be 24 millimeters. Whereas, by tangentially attaching straight legs 37 and 38 of lengths $L_{37}$ and $L_{38}$, respectively, to the ends x and y of the arcuate bend, an element would result wherein tongues 39 and 40 would still be effective, it appears that for an angle of $\alpha$ in excess of 135 degrees, an element would become too flat to be effective.

The elements of the invention described in FIGS. 1 to 8 are best made of metal strip or such other material that behaves in manufacturing like metal strip. For these materials, the length of the straight leg-width of the element relationship $3W>L>W/6$ would apply. The element of the invention which is described in FIG. 9 is, however, most readily made of plastics, that permit forming by the well known methods of injection molding, or other well proven methods of manufacture.

Figure 9:
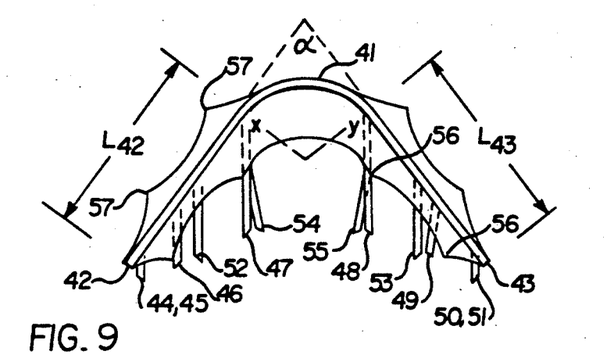
FIG. 9 is a frontal elevation of a form of the invention that lends itself particularly well to be made of plastics, as contrasted to the structures of FIGS. 1 to 8 which are readily and advantageously made of metal strip or other strip materials that have metal-like mechanical or structural properties.

FIG. 9 is a front-elevational view of such a piece. With all earlier discussed forms of the invention, the arcuate bend was actually a part of a circle. In order to show that the arcuate bend must not be circular and can be of any smooth curve or a part thereof such as parabolic, hyperbolic, elliptical or otherwise, the arcuate bend chosen in FIG. 9, denoted by numeral 41, is part of an ellipse, with its convex side pointing upwardly, as shown by numeral 41. Its ends are denoted by letters x and y and the straight legs 42 and 43 connect tangentially and smoothly with arcuate bend ends x and y.

Several tongues depending from straight legs 42 and 43 are shown, and point downwardly. In order to show that these tongues can embody wide variations in their construction and attachment to straight legs 42 and 43, and thereby add to the state of randomness of the packed bed in which the new packing is used, tongues numbered 44 to 48 and 50 to 54, for example, are all straight and point directly downwardly. Tongue 49, on the other hand, is straight as well, but is attached to the underside of straight leg 43 in a way that the tongue is slanted toward (or away) from the vertical axis of the piece. Another variation is shown by tongues 54 and 55, which are curved. The variations in tongue detail presented here are meant by way of example only and additional and other variations may be cited, without being outside the spirit of the invention.

Whereas, the consideration of FIG. 9 has so far only dealt with tongues that depend from the inside surfaces of the straight legs 42 and 43 and are progressing transversely, the element shown in FIG. 9 embodies another important feature by providing inner and outer longitudinally progressing tongues, denoted by numerals 56 and 57, respectively. The inside longitudinal tongue 56 fulfills the important function of collecting and conducting away accumulated liquid, and thus prevents liquid pool formation, and minimizes liquid hold-up. The outside transverse tongue serves the purpose of assuring a certain distance between adjacent packing elements in the packed bed. Thereby longitudinal tongue 57 prevents the blanking out of portions of the outside surface areas of the straight legs, which, if neglected to be achieved, would adversely affect the performance of the packing.

The preceding discussion has stessed the importance of the angle $\alpha$, or the element shown in FIG. 9, $\alpha = 75$ degrees. For the elements shown in FIGS. 1 to 8, so far discussed, the materials of construction were such that small wall thicknesses, usually below one half of a millimeter thickness were adequate. With plastic materials, on the other hand, wall thicknesses are normally always heavier than with metals, and for special applications, they may be as much as three millimeters or even more. Whereas, for packings that permit construction of thin gage materials, the smallest value of $\alpha$ that may be practical was found to be about 20 degrees, with the much thicker tongue means and their arrangement found in plastic packing elements, the angle $\alpha$ should not be less than 35 degrees, so that material overcrowding between the straight legs 42 and 43 does not occur and thereby affect performance adversely.

Figure 10:
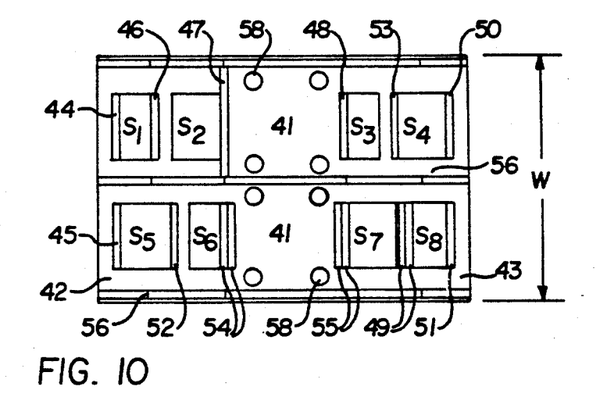
FIG. 10 is a view of the structure shown in FIG. 9 as seen from below.

FIG. 10 is a view of the packing element shown in FIG. 9, as seen from below. Items identified in FIG. 9 and shown also in FIG. 10 are denoted by the same numerals. The width of the element is denoted by letter W. It has been found that in view of the fct that the pieces described in FIGS. 9 and 10 are primarily to be made of plastics, the relationship between W and the lengths of the straight legs $L_{42}$ and $L_{43}$ should be limited to $2.5 W > L > W/5$.

FIG. 10 shows that the element contains eight slots, denoted by $S_1$ to $S_8$, as well as twelve depending tongues. Hence, there are four slots which, on both of their ends, are equipped with depending tongues. It is, of course, understood, although not shown in FIGS. 9 and 10, that additional tongues may be provided, space permitting, and any tongues need not necessarily depend from the ends of slots, but can be attached to the underside of straight legs 42 and 43, at locations away from the slots.

From FIGS. 9 and 10 it may further be seen that the tongues may be of any practical length, that is, they may either be as long as the extent of a slot or they may be larger or shorter than any slots contained in the element. It will be seen that the widths of all slots shown is the same. This is, however, not an absolute requirement as the slots may vary in their widths, and, as was pointed out before, may be of any practical design, such as trapezoidal, triangular, polygonal or otherwise. Another variation within the spirit of the invention is to have either all or some of the tongues extend all the way between the space between longitudinal slots 56 and be actually integrally joined to longitudinal slots 56, as is, for example, demonstrated with tongues 47 and 53.

It will be further noted that in the arcuate bend, denoted by numeral 41, there are neither slots nor tongues. Small holes which may be either circular or of other shape, denoted by numeral 58 may, however, be provided in the arcuate bend. These small openings are required to permit drainage of any fluid that may become lodged within the arcuate bend. They are normally of the order of magnitude of a few square millimeters. However, in special cases, where high liquid loadings are involved or where liquids of elevated viscosities are processed, these openings 58 may have to be larger. But in any event, their function is not to participate in the normal counter-current gas-liquid traffic for which the larger slots $S_1$ to $S_8$ are intended.

Figure 11:
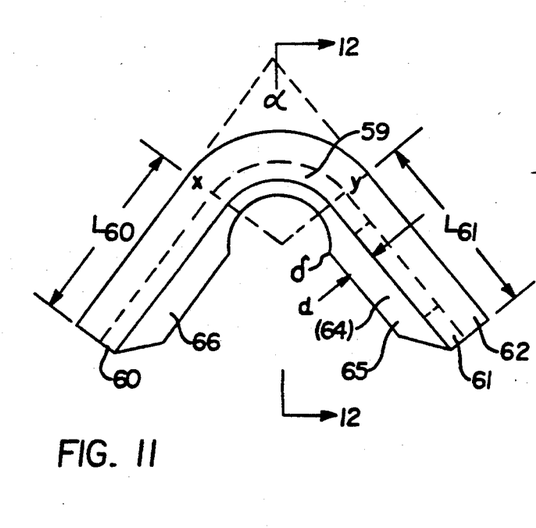
FIG. 11 is another frontal elevation of the invention that may be made of plastics but more readily of ceramic materials.

Attention is now directed to FIG. 11 which shows pertinent details of the invention when, broadly speaking, the new packing is made of ceramics, such as clay, chemical porcelain, glass or similar materials.

The arcuate bend is denoted by numeral 59 and is defined by span x - - - y. Joined tangentially and smoothly to x and y are straight legs 60 and 61, and their lengths are indicated by $L_{60}$ and $L_{61}$. The angle $\alpha$ is equal to 75 degrees. With a radius of curvature R of 14 millimeters (measured to the inside arc surface), the length of the arc is 26 millimeters. With the straight legs being 42 millimeters long, the arcuate bend-straight leg ratio is 0.619. As will be seen, the straight legs and the arcuate bend are equipped with a surrounding upwardly pointing flange, denoted by numeral 62, serving the purpose of providing strength to the element.

Figure 12:
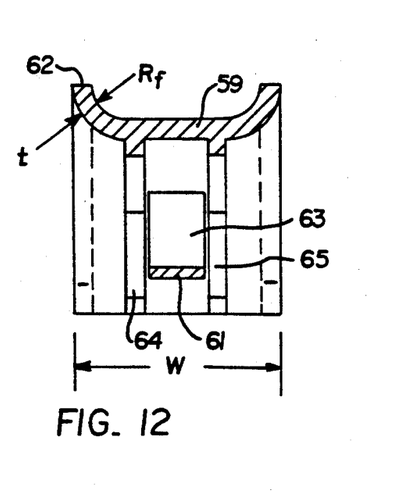
FIG. 12 is a sectional view of the form of the invention shown in FIG. 11, as it would appear along section line 12—12.

The details of how flange 62 is implemented, as well as other construction features are readily seen from FIG. 12, which is a sectional view of FIG. 11, as it would appear along section line 12—12. Flange 62 is thus seen to be a normal upwardly extending continuation of the arcuate base material 59, generated by a small radius of curvature, $R_f$. Normally, the value of $R_f$ is small, being more or less of the order of magnitude of the thickness of the material, referred to by letter t. Depending on the overall size of the new packing element, the thickness will normally vary between two millimeters or occasionally less up to about 10 millimeters or more, required for the largest pieces.

The element shown in FIG. 11 is provided with at least one slot in one of the straight legs. This slot, denoted by numeral 63, is apparent from FIG. 12. The location of slot 63 is also indicated by dotted lines in straight leg 61, recognizable in FIG. 11. Of course, it is within the spirit of the invention to provide the other straight leg 60 with a slot or slots as well. Any straight leg may, of course, also carry more than one slot, which slot does not necessarily have to be rectangular, as is shown in FIG. 12. As stated before, the slots may be of different shapes, such as trapezoidal, triangular, polygonal, round or elliptical.

On either side of slot 63, there is a tongue, denoted by numerals 65 and 66. The location of the tongues is more readily apparent from FIG. 11, the frontal elevation, where numeral (64) denotes the far end tongue and numeral 65 the near end tongue.

It will further be noted that tongues (64), 65, well as, 66 are longitudinal tongues, as was already spoken of in connection with the design of FIGS. 9 and 10. Although not indicated in FIGS. 11 and 12, it would, of course, be within the spirit of the invention to manufacture the new elements of packing shown in FIGS. 11 and 12 of ceramics, with transversely progressing tongues as well, all as has been described in connection with FIGS. 9 and 10.

It will be seen that longitudinal tongues 64 and 65 proceed over the entire length of slot 63. Beyond the upper end of the slot, at a point denoted by greek letter delta, the depth of the tongue, denoted by letter d, decreases and the material continues in somewhat diminished thickness to wind around the inside surface of the arcuate bend 59, of course being an integral part thereof, and serves as a reinforcement rib for the arcuate bend. The depths of tongues 64 and 65 must be chosen with deliberation, because the tongues do not only serve the purpose of providing better liquid distribution in the beds packed with the new ceramic packing, but the longitudinal tongues 64 and 65 are also instrumental to control the extent of mutual interlocking of the packing pieces in the packed bed, and therefore, their performance.

The width of the packing element when made of ceramics as referred to in FIG. 12 is indicated by letter W. As learned before, the width W may be related to the lengths of the straight legs $L_{60}$ and $L_{61}$. For the case when the new packing is made of ceramics it has been found that, as with plastics, best results are obtained when $2.5\,W > L > W/5$.

Figure 13:
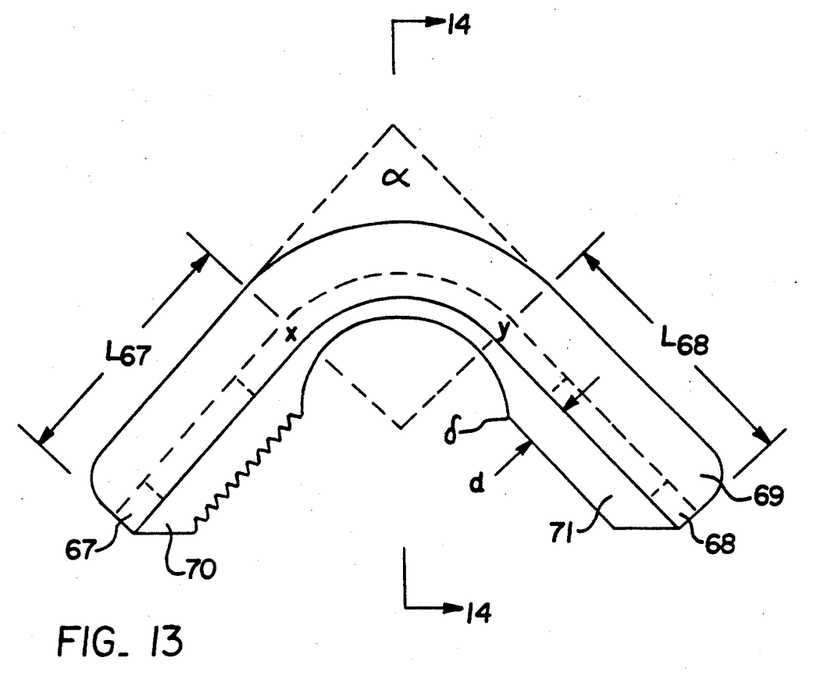
FIG. 13 is another form of the invention in frontal elevation illustrating certain refinements to the structure shown in FIG. 11.

Considering now a few further modifications, FIG. 13 shows the conception of the new ceramic packing again. The angle $\alpha$ for this design is 85 degrees and the arcuate bend is again defined by span x - - y. Straight legs 67 and 68 are joined tangentially to x and y and their lengths are denoted by $L_{67}$ and $L_{68}$. The surrounding upwardly pointing flange is denoted by numeral 69 and its lower extremity has been rounded to prevent chipping off of the ceramic material when in use. Longitudinal tongues 70 and 71 are provided with V-type notches for better interlocking and preventing shifting of the randomly dumped packing in the bed.

Figure 14:
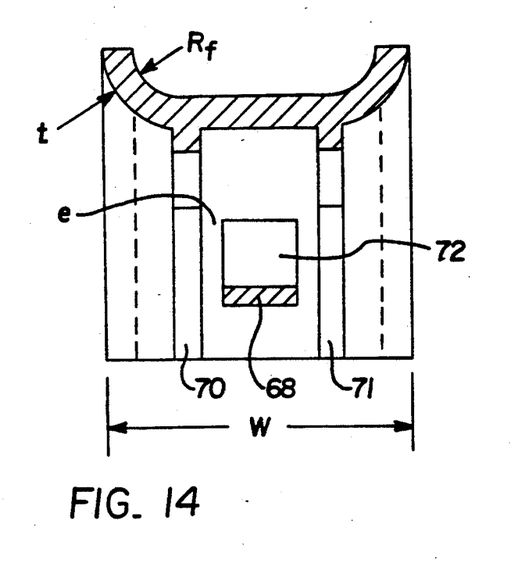
FIG. 14 is a sectional view of the invention shown in FIG. 13, as it would appear along section 14—14.

FIG. 14 is a section taken through line 14—14 of FIG. 13. It will be noted that the longitudinal tongues 70 and 71 are somewhat recessed from the sides of the slots 72, as indicated by letter e. The extent the recess e is normally of the order magnitude of the thickness of the material in the tongue. With the relatively thicker construction material required with ceramics, this is an important improvement as the fluid-carrying capacity of the slots is thereby greatly enhanced.

As far as the limiting angle $\alpha$ is concerned, when the new packing is made of ceramics, it has been found that the angle $\alpha$ should not be less than 40 degrees.

Figure 15:
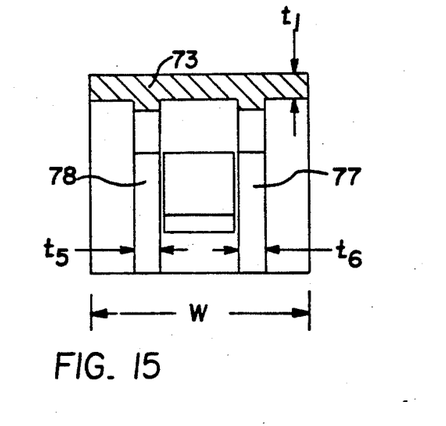
FIG. 15 is a sectional view illustrating another form of the invention of the structural type shown in FIG. 11, as it would appear along section line 12—12, but with modifications to show the structural variations in this particular embodiment.

Attention is now directed to FIG. 15 where a side elevation of an element is shown. The width of the element is denoted by W. It will be seen that the arcuate bend which defines the element, and which is identified by numeral 73 is not provided with any upturned flanges, such as are found in the elements shown in FIGS. 12 and 14. Otherwise the arucate bend 73 shown in FIG. 15 is seen to be of the same material thickness $t_1$ as is the case with the elements that are shown in FIGS. 12 and 14.

Figure 16:
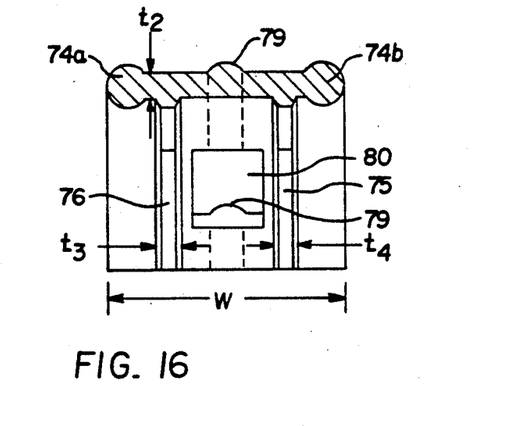
FIG. 16 is a sectional view illustrating another form of the invention of the structural type shown in FIG. 11, as it would appear along section line 12—12, but with modifications to show the structural variations in this particular embodiment.

Another modification of the element is shown in side elevation in FIG. 16. The width of the element is given by W. The thickness of material making up the arcuate bend denoted by numeral 74 is indicated by $t_2$. In contrast to FIG. 15 where the sides of the arcuate bend are plain, FIG. 16 shows that the sides have been globularly shaped as indicated at 74a and 74b. It is of course to be understood that although the globular reinforcements shown in FIG. 16 appear spherical, the side reinforcements may be ellipsoidal or any other shape without being outside of the scope of this invention.

Attention is now directed to tongues 75 and 76. It will be seen that these tongues are bevelled or tapered, showing a larger thickness $t_3$ at the base of attachment with the arcuate bend and a smaller thickness $t_4$ at the free ends of the tongues. This is in contrast to FIG. 15 in which the tongues 77 and 78 are not bevelled, and their thickness $t_5$ and $t_6$, are essentially the same as the thickness $t_1$ of the arcuate bend.

The advantages that are realized by bevelling or tapering the tongues, as shown in FIG. 16 are manifold. Principally, however, packing pieces that require molding in their manufacture are more readily freed from the molds when the tongues are bevelled. Additionally there will also be an advantage of providing more efficient liquid run off from bevelled tongues, resulting in better flow and mass transfer performance than when tongues of uniform thickness are used.

Another novel feature shown in FIG. 16 is the provision of the reinforcement rib 79, provided on the outer expause of the arcuate bend. By adding structural irregularity to arcuate bend it induces fluid turbulence and provides additional mass transfer. The ridge stops short of slot 80, and resumes again at the opposite end of slot 80. Thus the ridge does not interfere with liquid and gas flow through the slot.

Figure 17:
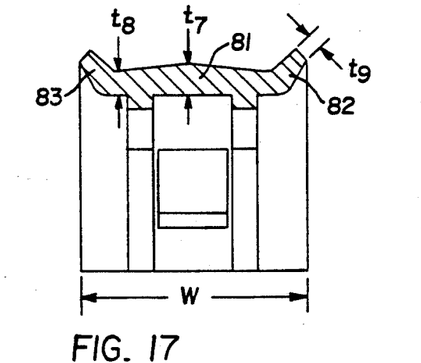
FIG. 17 is a sectional view illustrating another form of the invention of the structural type shown in FIG. 11, as it would appear along section line 12—12, but with modifications to show the variations in this particular embodiment.

Consideration is now given to FIG. 17, which represents another modification of the invention. The width of the element is again given by W. The arcuate bend identified by numeral 81 is of greater thickness $t_7$ at the center than farther toward the ends, as identified by $t_8$. Additionally both ends of the arcuate bend have been angularly turned upward, defining two flanges 82 and 83, and the thickness $t_q$ is smaller than $t_8$. It has been found that the provision of these flanges 82 and 83 are particularly helpful as far as greater ease of manufacture of the element shown in FIG. 17 is concerned. Moreover the flanges spaced and arranged as shown are effective to create a better state of randomness in the packed bed, and hence better fluid penetration and improved mass transfer.

Figure 18:
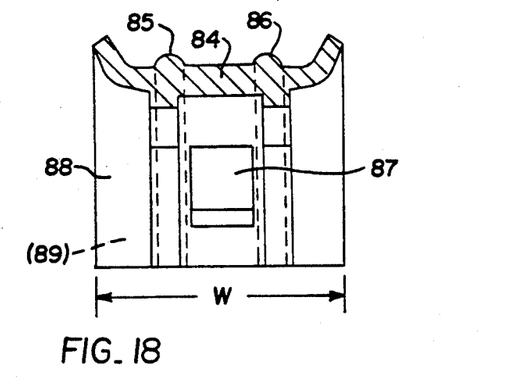
FIG. 18 is a sectional view illustrating another form of the invention of the structural type shown in FIG. 11, as it would appear along section line 12—12, but with modifications to show the structural variations in this particular embodiment.

Another variation of the arcuate bend 84 is shown in FIG. 18. Its thickness is variable throughout and two reinforcement ribs 85 and 86 have been provided on the outside. The width of the element is denoted by W, and as in FIGS. 15, 16 and 17, this is only wide enough to accomodate one slot 87 in each of the straight legs 88 and (89), (89) being the opposite leg not shown in the figure.

Figure 19:
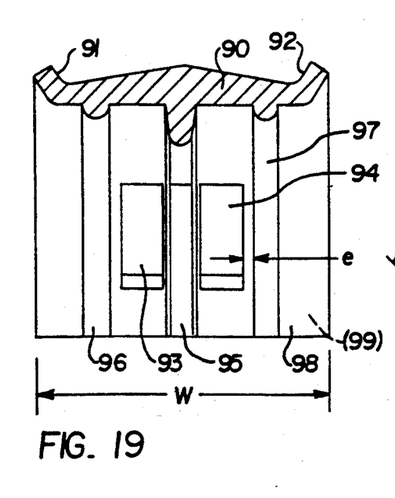
FIG. 19 is a sectional view illustrating yet another form of the invention of the basic structural type shown in FIG. 11, as it would appear along section line 12—12, but with structural modifications to show the variations in this particular embodiment.

Another modification of the element is shown in FIG. 19. The arcuate bend denoted by numeral 90 displays zones of various thicknesses and the rims of the arcuate bends are provided with upwardly pointing flanges 91 and 92. The width W of the modification is however large enough to accomodate two slots 93 and 94 in parallel to each other, either in one or in both of the straight legs 98 and (99)—the opposite leg not shown in the figure. It will be noted that these slots are separated by a closely placed tongue 95. Additionally, tongues 96 and 97 have been provided extending a small distance e away from the slots and progressing in the same direction.

Figure 20:
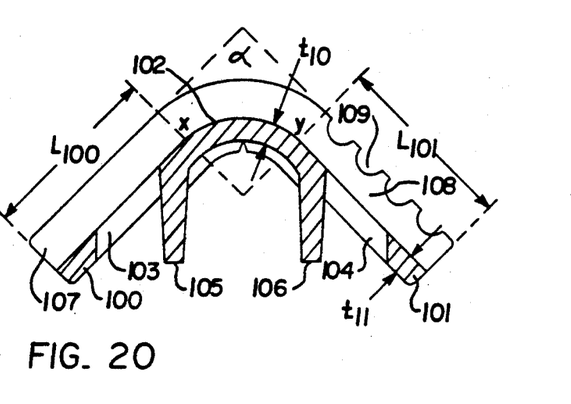
FIG. 20 is a view frontal elevation with vertical mid-sectioning of another embodiment of a tower packing element of the present invention.

In still another modification, a frontal elevation of the element is shown in FIG. 20. The straight legs identified by numerals 100 and 101, being of lengths $L_{100}$ and $L_{200}$ are joined smoothly to the termination of the arcuate bend 102 at points x and y. The angle through which the arcuate bend of FIG. 20 extends is equal to 90 degrees.

Each of the straight legs 100 and 101 are provided with slots 103 and 104 and it is seen that from the upper edge of each slot transverse tongues 105 and 106 are depending. Whereas these transverse tongues will normally extend along the entire upper edge of slots 103 and 104 it is conceivable that the tongues 105 and 106 may extend over either or both terminations of the upper edges of slots 103 and 104. Thus the transverse tongues 105 may be substantially longer than the widths of slots 103 and 104, and the tongues 105 and 106 may extend transversely along the entire width of the element.

Transverse tongues 105 and 106 extend substantially downwardly and are moderately tapered or bevelled toward their lower edge. It has been found that this feature will assist with a quick liquid run off, and besides will be instrumental to provide controlled spacing between the elements when randomly dumped into towers, thus improving mass transfer efficiency.

Both straight legs 100 and 101 are seen to be provided by upwardly extending flanges 107 and 108 which may be either smooth, as for instance on straight flange 107 or indented as shown at 109 on straight leg 108. The thicknesses of the arcuate bend and straight legs are denoted by $t_{10}$ and $t_{11}$ respectively.

Special importance attaches to the thickness of the material making up the arcuate bends and the straight legs joined smoothly thereto. Thus it has been found that best results are obtained in those instances in which the material thickness of the arcuate bends and the joined straight legs are uniform throughout as is indicated in FIGS. 12, 14, 15 and 20, wherein the material thickness shall range substantially between 0.05 to 0.5 of the width W of the element, which relationship may be expressed by $0.05 W < t < 0.5 W$. In all these instances in which the arcuate bend and the straight legs are of variable thicknesses as is shown for example in FIGS. 15, 17, 18 and 19 it shall then be the arithmetic average thickness $t_{avg}$ that shall be within the limits $0.05 W < t_{avg} < 0.5 W$.

Whereas preferred materials of construction are ceramics that lend themselves especially to the implementation of the elements as described in FIG. 11 to FIG. 20, the elements may of course be made of any other material such as chemical porcelain, clays, cement, concrete, glass, metals or any material that can be used to produce the elements, and all such examples are within the scope of the invention.

While I have illustrated and described several embodiments of my invention, it will be understood that these are by way of illustration only and that various changes and modifications are contemplated in my invention within the scope of the following claims.

I claim:

1. A tower packing element for use in randomly packed beds comprising a strip base shaped to define two straight elongated legs and an arcuately shaped bend, each of said straight legs consisting of one single straight segment only without being arcuately or angularly bent, said straight legs being smoothly and tangentially joined to the ends of said arcuately shaped bend and being open-ended on their other ends, both of said legs defining a critical angle $\alpha$ ranging from 20 degrees to 135 degrees when said legs are projected along respective imaginary lines beyond their tangential meeting points with said arcuately shaped bend, and at least one slot in the plane of at least one of said legs and at least one tongue depending from at least one of said straight legs and displaced from the plane of said straight legs and pointing away from the plane of said straight leg, said arcuately shaped bend being substantial in length and having a substantially smooth surface with no slots or depending tongues.

2. A tower packing element as claimed in claim 1 in which the tower packing element is made of ceramics and the length of each leg lies substantially in the range $2.4 W > L > W/5$, where W is the width of the tower packing element.

3. A tower packing element as claimed in claim 2 in which more than one tongue is associated with each slot.

4. A tower packing element as claimed in claim 2 in which at least one of the tongues extends longitudinally.

5. A tower packing element as claimed in claim 4 in which the longitudinally extending tongues depend toward the inside of the tower packing element and are substantially offset from the confining edges of the slots in the straight legs.

6. A tower packing element as claimed in claim 5 in which the edges of the longitudinally extending tongues which depend toward the inside are serrated.

7. A tower packing element as claimed in claim 1 wherein at least one of the tongues extends longitudinally.

8. A tower packing element as claimed in claim 7 wherein said longitudinal tongues are tapered inwardly in their thickness as they progressively protrude from the associated leg.

9. A tower packing element as claimed in claim 7 wherein the strip base is provided with globularly shaped longitudinal edges.

10. A tower packing element as claimed in claim 7 including at least one longitudinally extending reinforcement rib protruding along the outer expanse of the strip base.

11. A tower packing element as claimed in claim 7 wherein the longitudinal edges of the strip base are turned upwardly away from the inside of the strip bend.

12. A tower packing element as claimed in claim 11 wherein the upwardly turned longitudinal edges are outwardly tapered.

13. A tower packing element as claimed in claim 11 wherein the central thickness of the strip base is greater than the thickness thereof immediately adjacent said upturned edges.

14. A tower packing element as claimed in claim 11 which includes two longitudinally extending reinforcement ribs protruding along the outer expanse of the strip base adjacent the slots.

15. A tower packing element as claimed in claim 7 including three of the longitudinally extending tongues on the inside of the strip base with the slots positioned on either side of the centrally positioned tongue.

16. A tower packing element as claimed in claim 15 wherein at least one of the tongues is outwardly tapered.

17. A tower packing element as claimed in claim 1 wherein the thickness of the strip base is substantially uniform throughout.

18. A tower packing element as claimed in claim 17 wherein said thickness t in relation to the width W of the base strip is expressed as $0.05 W < t < 0.5 W$.

19. A tower packing element as claimed in claim 1 wherein the average thickness $t_{avg}$ of the strip base in relation to its width W is expressed as $0.05 W < t_{avg} < 0.5 W$.

20. A tower packing element as claimed in claim 19 which is constructed of ceramics.

21. A tower packing element as claimed in claim 1 in which the tongue extends into the space between the two straight legs and depends from one end of said slot.

22. A tower packing element as claimed in claim 1 in which a plurality of slots with associated tongues are arranged in rows in the legs, the rows extending substantially longitudinally of the base, the arcuate bend being without slots and associated tongues.

23. A tower packing element as claimed in claim 1 which is made of metal, in which the length L of each leg lies substantially in the range $3W > L > W/6$ where W is the width of the leg and in which the angle between the straight legs is at least equal to 20 degrees.

24. A tower packing element as claimed in claim 1 in which the tower packing element is made of plastic and the length of each leg lies substantially within the range $2.5W > L > W/5$.

25. A tower packing element as claimed in claim 24 in which the angle between the straight legs is not smaller than 35 degrees.

26. A tower packing element as claimed in claim 25 which comprises transverse tongues with associated slots as well as longitudinal tongues pointing to the inside as well as to the outside of said tower packing element.

27. A tower packing element as claimed in claim 26 in which the transverse tongues are substantially straight.

28. A tower packing element as recited in claim 27 in which at least some of said tongues are slanted toward the vertical axis of the tower packing element.

29. A tower packing element as recited in claim 28 in which more than one tongue may depend from any one associated slot.

30. A tower packing element as claimed in claim 1 wherein at least one of said substantially straight legs is tangentially attached to one of the ends of a secondary arcuate bend having reverse curvature from a primary arcuate bend, and a secondary substantially straight leg being tangentially attached to the other end of said secondary arcuate bend and said second substantially straight leg ending open-endedly.

31. A tower packing element as claimed in claim 1 wherein the tongue depends downwardly from the upward end of said slot.

32. A tower packing element as claimed in claim 31 wherein said tongue tapers inwardly in thickness as it protrudes away from the strip base.

33. A tower packing element as claimed in claim 32 which has upturned outer longitudinal edges on the strip base.

34. A tower packing element as claimed in claim 33 wherein the upturned edges are indented.

* * * * *